United States Patent
Curutchet et al.

(10) Patent No.: US 9,841,003 B2
(45) Date of Patent: Dec. 12, 2017

(54) ROTARY MACHINE COMPRISING A ROTOR PLACED IN A FLUID AND EQUIPPED WITH ORIENTABLE BLADES

(71) Applicant: ADV TECH, Merignac (FR)

(72) Inventors: Arnaud Curutchet, Merignac (FR); Stephane Grosmangin, Andernos les Bains (FR); Renaud Fourton, Taussat (FR); Gabriel Corde, Lege Cap Ferret (FR)

(73) Assignee: ADV TECH, Merignac (FR)

( * ) Notice: Subject to any disclaimer, the term of this patent is extended or adjusted under 35 U.S.C. 154(b) by 171 days.

(21) Appl. No.: 14/412,691

(22) PCT Filed: Jul. 5, 2013

(86) PCT No.: PCT/IB2013/055525
§ 371 (c)(1),
(2) Date: Jan. 5, 2015

(87) PCT Pub. No.: WO2014/006603
PCT Pub. Date: Jan. 9, 2014

(65) Prior Publication Data
US 2015/0147176 A1    May 28, 2015

(30) Foreign Application Priority Data

Jul. 5, 2012 (FR) .................................. 12 01899

(51) Int. Cl.
*F03D 3/06* (2006.01)
*F03D 3/00* (2006.01)
(Continued)

(52) U.S. Cl.
CPC ............... *F03D 3/068* (2013.01); *B63H 1/10* (2013.01); *F03D 3/005* (2013.01); *F03D 7/0224* (2013.01);
(Continued)

(58) Field of Classification Search
CPC .................................. F03D 3/067; F03D 3/068
See application file for complete search history.

(56) References Cited

U.S. PATENT DOCUMENTS 4,282,944 A * 8/1981 Trumpy ................. B60K 16/00
                                                                180/2.2
4,380,417 A * 4/1983 Fork ..................... F03B 17/067
                                                                416/108
(Continued)

FOREIGN PATENT DOCUMENTS

CN         101487445 A       7/2009
DE         2919328 A1 * 11/1980 ............. F03D 3/068
(Continued)

OTHER PUBLICATIONS

English translation of DE 19603982.*
(Continued)

*Primary Examiner* — Woody Lee, Jr.
*Assistant Examiner* — Topaz L Elliott
(74) *Attorney, Agent, or Firm* — Blakely Sokoloff Taylor & Zafman LLP

(57) ABSTRACT

A fluidic rotor rotary machine has a rotor comprising at least one blade (4) mounted on an arm (2) rotating about a main axis (1) of the rotor, the rotor being held by a support structure (5) in an orientation such that said axis (1) is essentially perpendicular to the fluid flow direction, the blade (4) being pivotally mounted about a rotational axis (3) parallel to the main axis (1), the machine being characterized in that it comprises means for generating a relative rotational movement of the blade (4) relative to the arm (2) at the rotational axis (3), thereby varying the blade angle, said means comprising an eccentric mechanism rotating on said blade rotational axis.

(Continued)

Application in particular to propellers and generators operating according to Lipp-type or Voith-Schneider-type kinematics, with possible mode switching.

9 Claims, 12 Drawing Sheets

(51) Int. Cl.
    *F03D 7/04*     (2006.01)
    *F03D 7/02*     (2006.01)
    *B63H 1/10*     (2006.01)

(52) U.S. Cl.
    CPC .......... *F03D 7/04* (2013.01); *F05B 2260/506* (2013.01); *F05B 2260/72* (2013.01); *F05B 2260/75* (2013.01); *F05B 2260/79* (2013.01); *Y02E 10/74* (2013.01)

(56) References Cited

U.S. PATENT DOCUMENTS

| | | |
|---|---|---|
| 6,320,273 B1 | 11/2001 | Nemec |
| 2008/0258469 A1 | 10/2008 | Stephens et al. |
| 2010/0054936 A1* | 3/2010 | Sneeringer .............. F03D 3/068 416/1 |
| 2011/0110779 A1 | 5/2011 | Stephens et al. |

FOREIGN PATENT DOCUMENTS

| | | | | |
|---|---|---|---|---|
| DE | 3000134 A1 | * | 7/1981 | ............ F03D 3/068 |
| DE | 19603982 A1 | * | 8/1997 | ............ F03D 3/068 |
| GB | 191019430 A | * | 0/1911 | .......... B64C 11/006 |
| JP | 56-18076 | | 2/1981 | |
| JP | 2001-107838 A | | 4/2001 | |
| JP | WO 2011086606 A1 | * | 7/2011 | ............ F03D 3/068 |
| JP | 4887998 B2 | * | 2/2012 | ............ F03D 3/068 |
| JP | WO 2012039249 A1 | * | 3/2012 | ............ F03D 3/068 |

OTHER PUBLICATIONS

English translation of DE 2919328.*
English translation of DE 3000134.*
English translation of WO 2011086606.*
English translation of WO 2012039249.*
English translation of WO 9207189.*
English translation of JP 4887998.*
PCT Search Report dated Nov. 20, 2013, PCT Appln. No. PCT/IB2013/055525 (3 pages).
Devillers. "Etudes des Performances d'un Propulseur Cycloidal Nouveau." 5e Journees de l'Hydrodynamique, 22, 23, 24 (Mar. 1995), with English translation of relevant portions.

* cited by examiner

A    B    C

- - PRIOR ART - -

ROTARY MACHINE COMPRISING A ROTOR PLACED IN A FLUID AND EQUIPPED WITH ORIENTABLE BLADES

TECHNICAL FIELD

The invention relates to generators and propellers working in a transverse fluid flow, and more particularly to a new mechanism for performing the servo control of the inclination of a blade mounted on a rotor as a function to the rotation of the latter.

PRIOR ART

According to the prior art, the Lipp rotor is known, and more particularly the mechanism for pitching the blades of a rotor arranged in a transverse fluid flow (see WO9207189A1). The pivot axes of the blades are parallel to the rotor shaft, on the periphery of which they are arranged. Each of them is connected to a toothed pinion in permanent meshing engagement with its intermediate pinion, which itself is in permanent meshing engagement with the central pinion, fixed in absolute terms but off-center relative to the shaft; the pinion remaining free on the other hand.

This rotor is thus made up of blades whose incidence is controlled according to the rotation of the rotor. The mechanical system is based on complex cascades of gears, with satellite pinions. The servo-control of the angular position of the blades is accomplished by varying the position of the central pinion according to the angular position of the rotor. At each cycle, it is necessary to constantly change the position of this central pinion, which is slidable, so as to orient the blades around an average angle kept constant relative to the fluid flow by means of the cascaded pinions. This technical solution is complicated, heavy, power-consuming, and certainly not suitable for use e.g. in the design of a wind turbine.

SUMMARY OF THE INVENTION

The present invention aims at providing a new mechanical solution for ensuring the angular servo-control of blades as a function of the rotation of the rotor on which they are mounted. The pivot axes of the blades are parallel to the rotor shaft, on the periphery of which they are arranged. This new mechanism is simple, offers a good yield, leaves several design freedom factors in particular to manage the maximum pitch of the blades, and is adaptable to large diameter rotors. It is particularly suitable for the production of wind turbines, whether in horizontal or vertical configuration.

Another object of the invention is a new mechanical solution that also allows switching from one mode to another, e.g. from a Lipp rotor type mode to a Voith machine type mode.

To this end, it is provided a fluidic rotor rotary machine, the rotor comprising at least one blade mounted on an arm rotating about a main axis of the rotor, the rotor being held by a support structure in an orientation such that said axis is essentially perpendicular to the fluid flow direction, the blade being pivotally mounted about a rotational axis parallel to the main axis, the machine being characterized in that it comprises means for generating a relative rotational movement of the blade relative to the arm at the rotational axis, thereby varying the blade angle, said means comprising an eccentric mechanism rotating on said blade rotational axis.

Certain preferred but not limiting aspects of this machine may include the following additional features, taken individually or in any technically compatible combinations for the skilled person:

- the eccentric mechanism comprises a transfer member rotating about a rotational axis shifted relative to the rotational axis, one end of said transfer member being connected to the blade and the other end being connected to a crankshaft.
- the crankshaft is mounted on a shaft defining the rotational axis and mounted on the arm.
- the mechanism comprises an eccentric member mounted on the rotational axis and carrying the pivot, and means for synchronizing the rotational movement of said member with the rotation of the rotor about the main axis.
- the synchronizing means are adapted to keep the eccentric member in the same orientation irrespective of the angular position of the rotor, the crankshaft being fixed relative to the arm, to thereby provide a Lipp-type kinematics.
- the synchronizing means are adapted to rotate the eccentric member with the arm, the crankshaft retaining the same orientation irrespective the angular position of the rotor, thereby achieving a Voith-Schneider-type kinematics.
- the machine comprises means for varying the maximum pitch angle of incidence of the blade(s) as a function of the fluid flow velocity.
- said means comprise members for the self-modification of the geometry of the control between the eccentric mechanism and the blade.
- said means comprise members for adjusting the control geometry between the eccentric mechanism and the blade.
- the constant orientation of the eccentric member, respectively of the crankshaft, is obtained by a one-to-one ratio angular transmission between a member rotating with the arm and a member rotating with the eccentric element, respectively with the crankshaft.
- the machine comprises mode switching means for selectively engaging the member either with the eccentric member, or with the crankshaft, and for releasing the crankshaft or the eccentric element, respectively.

The invention has many advantages.

It can operate in violent fluid flows since it is possible to permanently control the maximum pitches of the blades. In generator mode, when the fluid flow increases, or in propeller mode, when the rotational speed of the rotor increases, it is possible to automatically reduce the incidence angles of the blades, and therefore to preserve the rotor mechanism, while continuing to produce energy in case of use as a generator. The control of the maximum incidence of the blades also allows increasing yield over a wider range of flow strength, in generator mode as well as in propeller mode. These pitch range values can be controlled in an embodiment by adjusting the position of the anchor point of the connecting rod on the crankshaft. By making the point of attachment of the connecting rod closer to the central axis of the crankshaft, the rod stroke length is reduced, and therefore the amplitude of the movement of the rudder, and thus at the end the maximum angles of the blade.

The invention generates little noise during operation.

In wind turbine mode, it does not exhibit the high blade tip speed problem as experienced in the case of conventional wind turbines. In addition, it has the advantage, from the environmental standpoint, to be more visible for birds than a wind turbine.

The invention allows making small size rotors, e.g. for micro-pumps, as well as very large size rotors for making large windmills.

According to an embodiment, the rotor is particularly robust as each blade is attached to the structure at its two ends.

The testing of different rotor diameters and different blade widths and profiles can be conducted to determine the best compromise depending on the nature of the flow, its average and peak power, and the type of use of the invention, i.e. in generator or propeller mode. Hydrodynamic and aerodynamic simulations will also allow validating these choices. The invention allows making versions generator or propeller versions with horizontal axis or vertical axis.

According to an embodiment, the rotor diameter can be made adjustable in order to increase the adaptability of the machine to the flux strength.

According to another embodiment, a plurality of blades with identical or different profiles and dimensions can be mounted on one same arm. The spacing between the blades must be sufficient to allow them to rotate around their own rotational axis.

BRIEF DESCRIPTION OF THE DRAWINGS

Other features, aims and advantages of the invention will appear from the following description, which is purely illustrative and non-limiting and should be read with reference to the accompanying drawings in which.

DETAILED DESCRIPTION OF PREFERRED EMBODIMENTS

A fluid-powered machine provided with a mechanism synchronized to the revolution of a rotor arranged in a cross-flow of fluid will now be described, the mechanism allowing controlling the incidence of at least one blade mounted on the periphery of the rotor.

Figure 1:
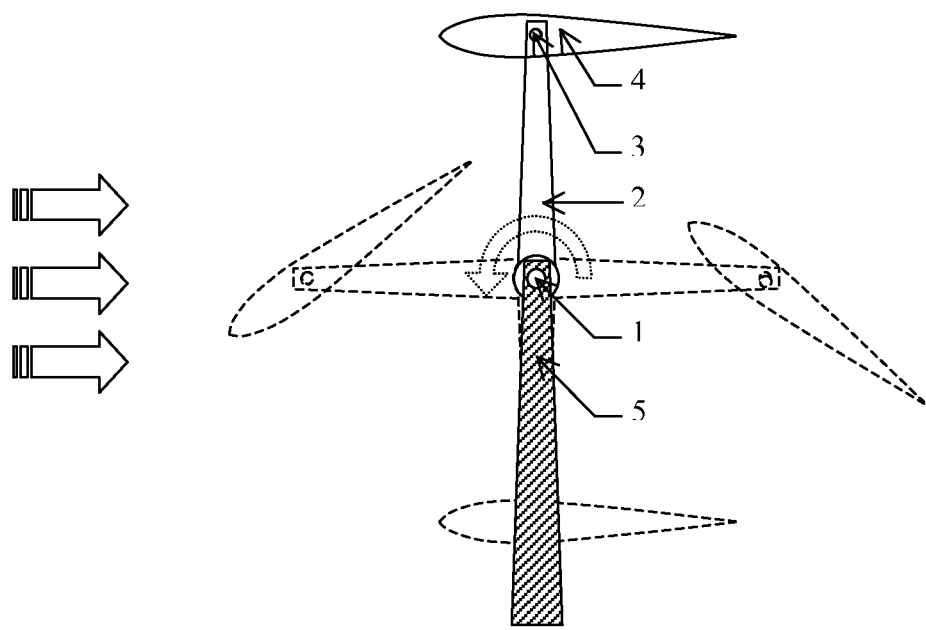
FIG. 1 is a profile view of the invention provided with a single blade (4) illustrated for four positions of the rotor.

FIG. 1 shows a general profile view of a one-blade Lipp kinematics type rotor, intended to illustrate the movement of the blade as a function of the angular position of the rotor. The rotor rotates about an axis 1, held by a support structure 5. The blade 4, located at the end of an arm 2, can pivot about axis 3 parallel to axis 1 according a certain cycle and in a range of angles between −90° and +90° relative to the direction of flow, by means of a synchronous mechanism that will now be described.

Figure 2:
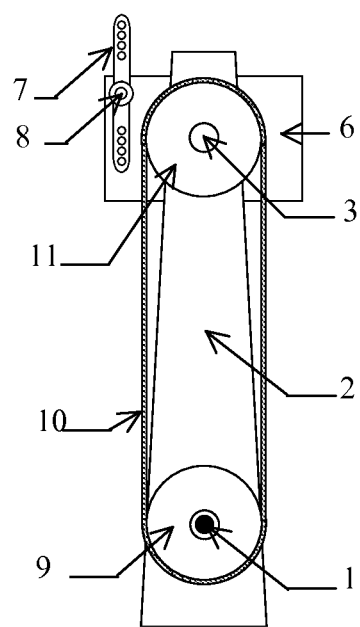
FIG. 2 is a detailed view of the first part of the mechanism for controlling the blade pitch as a function of the angular position of the rotor.

The first part of the synchronous mechanism is detailed in FIG. 2. This mechanism comprises an eccentric element 6, here called a pod, on which is fixed a pivot 8 around which a deflection element 7 or rudder pivots. The pod 6 is secured to a pulley 11, itself connected to a fixed pulley 9 via a belt (or chain) 10, so that when the rotor rotates about its rotational axis 1, the pod 6 always remains oriented in the same direction. According to one embodiment, the gear ratio of the two pulleys is equal to 1. The pod element can be designed in different ways. The choice of the position of pivot 8 on pod 6 is determined mainly as a function of the size of the machine and as a function of the design of the second part of the mechanism, described below with reference to FIG. 3.

Figure 3:
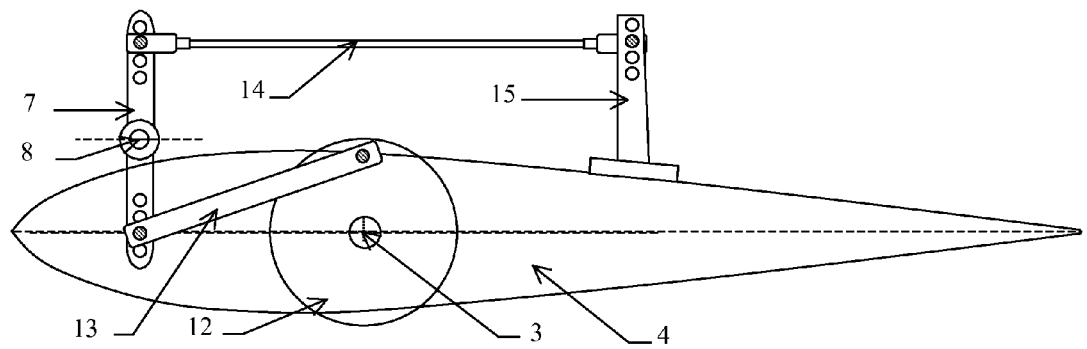
FIG. 3 is a detailed view of the second part of the mechanism for controlling the blade pitch as a function of the angular position of the rotor.

FIG. 3 is a detailed view of the second part of the mechanism for controlling the pitch of blade 4 as a function of the angular position of the rotor. The blade 4 rotates around axis 3. According to this first embodiment, a disk 12 forms a crankshaft, the central axis of which is fixed on a second arm opposite the first arm 2. The crankshaft may have various shapes without being limited to a mere disk. On the crankshaft is attached a connecting rod 13 connected to rudder 7 and which rotates about pivot 8 provided on pod 6. The other end of the rudder is connected to a rod 14, itself connected to a horn 15 fixed to the blade. When the rotor rotates, the crankshaft is not turning, but the pod rotates relatively around the crankshaft which is fixed as being directly attached to the opposite arm 2.

Figure 4:
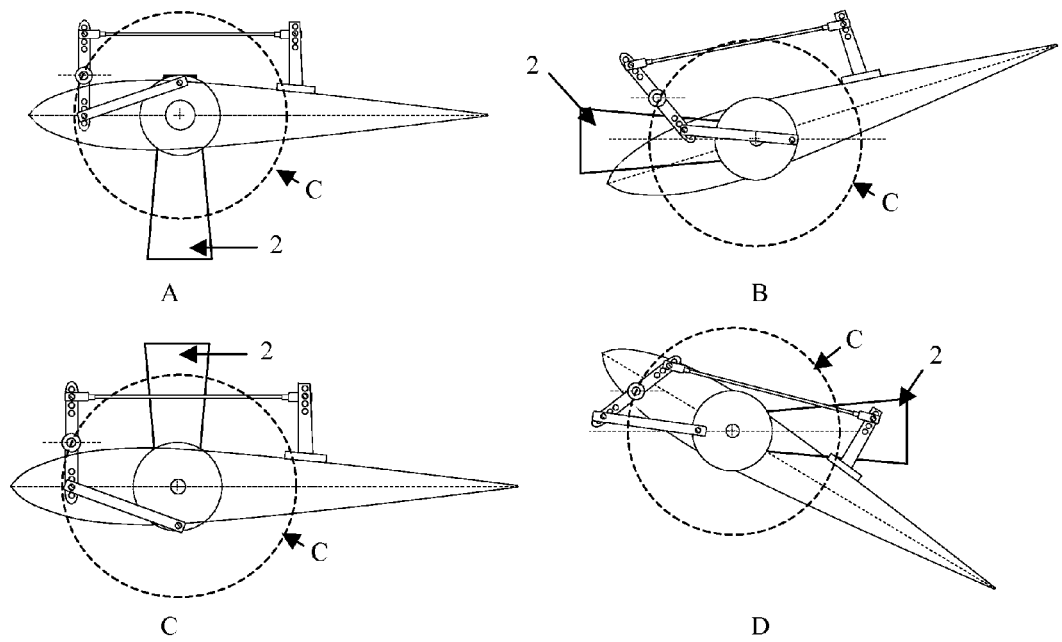
FIGS. 4A to 4D show the operating cycle of the mechanism for controlling the blade orientation described in FIGS. 2 and 3.

FIGS. 4A to 4D show the operating cycle of the mechanism described in FIGS. 2 and 3 for controlling the blade pitch as a function of the angular position of the rotor. Contrary to the embodiment described in FIG. 1, this time the rotor rotates clockwise and the application is in this case is a windmill. As in FIG. 1, the air flow comes from the left. The blade which is "upwind" or "closest to the wind" according to the admitted terminology is in ascending phase, with leading edge oriented upwardly, and the blade which is in the most "downwind" position is in descending phase, the leading edge oriented downwards. FIG. 4A shows the blade in the upper position. As soon as this position is passed through, according to the principle of the Lipp machine, the blade must be gradually turned downwardly in order to generate a force urging the continued rotation of the rotor. FIG. 4B shows the blade in this phase of the cycle, where the rotor has rotated through 90° from its initial position of FIG. 4A. When the rotor is has travelled through 180° from its initial position, the blade must again be maintained against the wind, as shown in FIG. 4C. After these 180° of rotation, the blade is in ascending phase, with its leading edge oriented upwardly. FIG. 4D shows the blade in this ascending phase, at 270° from the initial position. It can be seen by successively observing these four Figures that the crankshaft constituted by disk 12 has remained in the same position relative to arm 2. During an operating cycle, the pivot 8 on which the rudder 7 pivots describes a circle centered on the axis 3, this circle being illustrated in dotted line shown in FIGS. 4A to 4D. This pivot 8, attached to pod 6, is moving relative to the arm 2.

Figure 5:
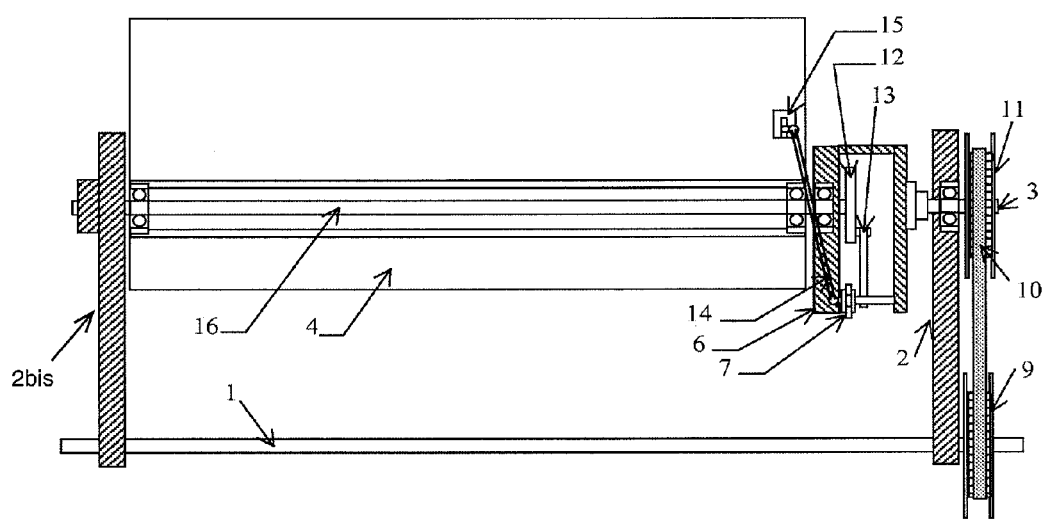
FIG. 5 is a section of the entire mechanism for controlling the blade orientation as a function of the angular position of the rotor.

FIG. 5 is a sectional view of the entire mechanism for controlling the blade pitch as a function of the rotation of the rotor. In this embodiment, the blade is attached at each of its ends. The shaft 16 mounted in line with axis 3, around which blade 4 rotates, is attached to arm 2*b* is opposite arm 2. At the end of shaft 16 is attached the disc 12 forming the crankshaft, which drives the connecting rod 13, itself connected to the transfer member 7 pivots about pivot 8 attached to pod 6. Without rod 14, the blade 4 would turn freely about shaft 16.

According to one embodiment, the connecting rod is not directly connected to the rudder; the rod head can be attached to a translation-movable portion, for example on a carriage mounted on a linear rail, this movable portion being then connected to the rudder through an additional transfer element. This solution allows if necessary to compensate the asymmetry of the blade movement observed on a full rotation cycle of the rotor, which asymmetry is inherent to the mechanical principle of the connecting rod mounted directly on transfer member 7. This asymmetry can also be compensated by adjusting the geometry of the various elements: transfer member 7, rod 14 and horn 15.

Figure 6:
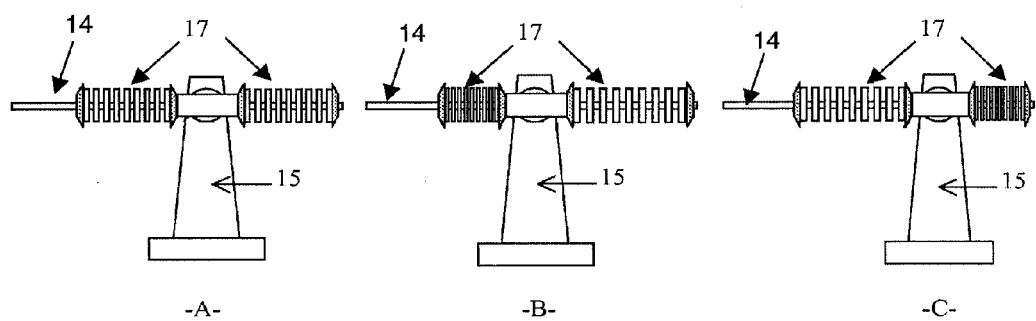
FIGS. 6A to 6C show according to one embodiment a solution for decreasing the maximum blade angle.

FIGS. 6A to 6C show a variant embodiment for reducing the maximum angle of the blade for high flow velocities. The attachment point of rod 14 on horn 15 is made variable by means of a system based on the use of one or more dampers 17. One can select the spring force and the stroke of the damper(s) such that, beyond a given force applied on the blade, the pitch of the latter relative to the flux becomes negligible or even zero regardless of the position of rudder 7. An hydraulic approach is not to be overlooked because in addition to playing a role in safeguarding the integrity of the machine, it can allow a fine adjustment of the angular position of the blade as a function of the rotor position and limiting or avoiding oscillation phenomena.

Figure 7:
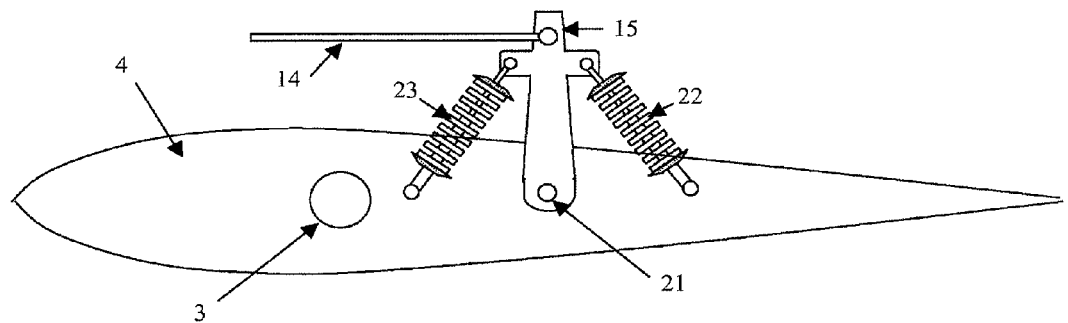
FIG. 7 shows another mechanical variant for decreasing the maximum blade angle.

According to another embodiment, the control of the maximum values of the blade angles as a function of the flow strength is achieved by allowing the horn to pivot around axis 21 affixed to the blade, as shown in FIG. 7. Dampers 22, 23 are mounted between the horn and the blade, so as to allow a self-adjustment of the angle of the horn relative to the blade as a function of the force applied to it. When a damper is compressed, the blade pitch decreases.

According to another embodiment, one can handle the blade pitch limit values by means of an actuator for changing the stroke of rod 13 by varying the distance between the rod base and the center of crankshaft 12. A cam whose axis of rotation would be located on the axis of rotation of the crankshaft may bear on the rod base that slides along a radius of the crankshaft. By actuating this cam by means of a mechanical servo system, it is possible to move the rod base away or closer to the crankshaft rotational axis, thereby changing the rod stroke. The portion of the mechanism that slides in the crankshaft can be maintained by a spring located at the crankshaft periphery.

According to other embodiments, the servo control of the rod base position can be ensured by systems combining electromechanical, pneumatic, hydraulic, and electronic solutions.

Figure 8:
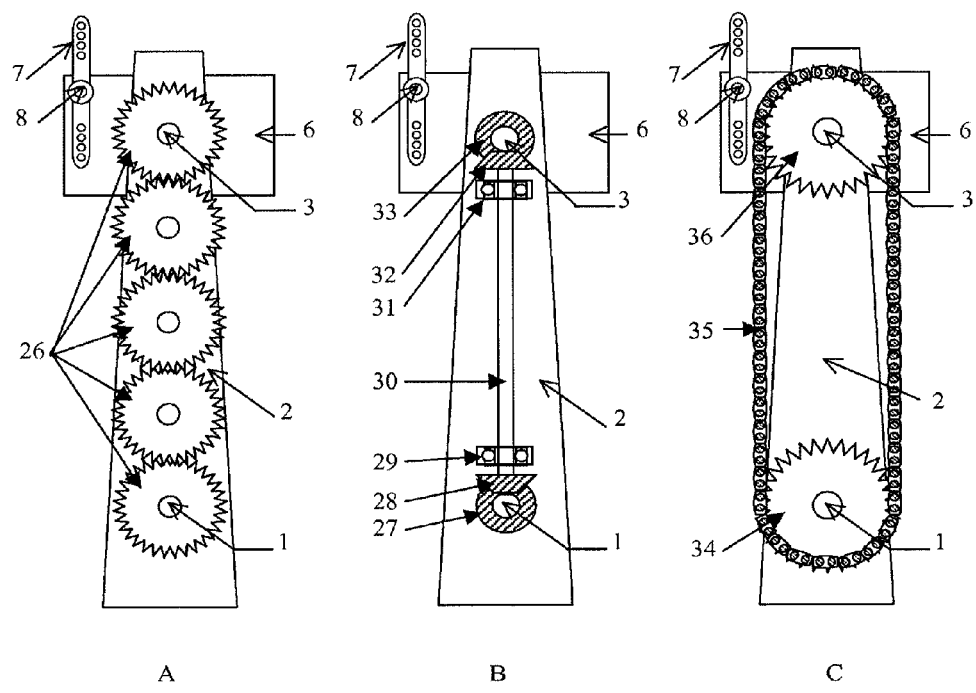
FIGS. 8A to 8C show other technical solutions for the achieving the angular control of the pod, either with a plurality of cascaded pinions, or with angular converters, or with a chain and a pair of sprockets.

According to other variant embodiments, the pulleys/belt assembly can be replaced by a cascade of pinions (FIG. 8A), 900 angular gearing (FIG. 8B) or else a chain and two sprockets (FIG. 8C). According to yet other variants, not shown, of hydraulic, electrical or pneumatic drive systems can be used.

Figure 9:
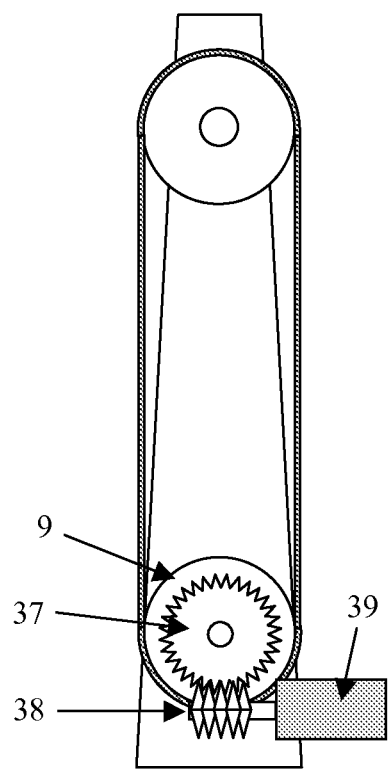
FIG. 9 shows a variant of the invention where the angular position of the pinion (9) is made variable by means of an actuator, which allows controlling the direction of the leading edge of the blade with respect to the flow direction or directing the flow.

FIG. 9 shows an approach for changing the angular position of pinion 37 by means of an actuator 39 using a worm 38. This allows an angular shifting of the blade cycle relative to the angular position of the rotor. This possibility can be interesting, especially when the invention is used to design a vertical axis generator, or when used to achieve a propeller where the flow direction can be controlled.

One of the essential advantages of the invention is its adaptability as a function of the flow speed, whether recovered or generated according to whether the mode is generator mode or propeller mode. To maintain a high yield over a wide range of flow velocities, it is possible to vary the maximum blade pitch angles as a function of the flow velocity. The higher the flow velocity, the lower must be the blade pitch limit values, to become almost zero in extreme conditions.

In the case of a chain, angular gearing or pinion cascade system, oil-filled crankcases can be provided to minimize wear of these mechanical transmission components and to increase yield as far as possible. Self-lubricated chains can also be used on low-cost versions.

In the case of chains or belts operation, an automatic tensioning system is advantageously provided in a manner known per se, for limiting the maintenance operations.

A classic gearing or angular gearing drive has the advantage of avoiding the problem of chain or belt tension, however with a lower yield. However, the system based on angular gearing is advantageous for making large size rotors and for minimizing the maintenance operations.

The invention can be embodied in horizontal or vertical versions.

a) Horizontal Generator Embodiment

In the horizontal version, the entire structure must be able to rotate about a vertical axis so as to permanently keep the generator facing the fluid flow. A fin can be used like for a weather vane, but on larger scale versions, an electromechanical servo control of the position of the generator relative to the flow direction is preferred.

According to one embodiment, it is possible to generate a different pitch between the moments where the blades are most upstream in the fluid flow and the moments where they are most downstream in the fluid flow. In particular, one can provide that the pitch is more pronounced for the blades which are the most downstream in the flow, i.e. partially masked by the other blades that lie more upstream it the flow.

According to one embodiment, in a horizontal axis generator mode, one can provide that the blades that are the most upstream in the fluid are in an ascending phase while the blades that are the most downstream in the fluid flow are in a descending phase.

In another embodiment, still in a horizontal axis generator mode, one can provide that the blades that are the most upstream in the fluid are in an descending phase while the blades that are the most downstream in the fluid flow are in an ascending phase.

The main advantage of the horizontal generator version is its simplicity.

b) Vertical Generator Embodiment

In vertical axis generator mode, two solutions can be adopted to maintain the system in the correct direction relative to the fluid flow.

The first solution is to use, as the horizontal case, a weather vane type system allowing to maintain the entire structure in the correct direction relative to the fluid flow direction.

The second solution, more advanced, consists in rotatably controlling pulley 9 via an actuator 39, as shown in FIG. 9. Indeed, driving this pulley (or pinion, or gear, or angular gear) allows changing the direction of the attack angle of the blade(s) relative to the fluid flow direction, thus avoiding the need to mount the whole structure on a weather vane. A servo control of the actuator must be done according to the fluid flow direction.

In case where the principle of controlling the central pinion position would be retained in a propeller embodiment, it is thus possible to direct the flow through 360°. In the case of a horizontal axis propeller, this solution enables a "trim" function similar to the one of marine screw propellers.

According to various embodiments, the rotor can be designed to rotate clockwise or counterclockwise.

According to one embodiment, an odd number of blades is preferred so as to make the system inherently unstable, thereby facilitating its initial rotation without assistance in a generator embodiment.

According to various embodiments, the rotor can include up to several tens of blades, uniformly distributed over the whole rotor circumference.

According to various embodiments, a plurality of blades may be mounted on the same rotor arm. The spacing between these blades must be sufficient to allow rotation of each blade about its own pivot axis. The blades mounted on the same arm may be identical or have different sizes and shapes. According to one embodiment, the blades closest to the rotor center can have a shorter chord than the blades mounted at the arm free end. Each blade can have its own servo mechanism or a single servo mechanism per arm can be used to control by itself the different blades of the same arm.

According to various embodiments, the blades can have a symmetrical profile or an asymmetric profile.

According to one embodiment, it is possible to integrate to the blades flaps that allow changing the leading edge and/or the trailing edge of the blades. It is also possible to integrate double flaps and to make the blade profile deformable. The use of an airbrake on the blade, controlled by an electronic circuitry, can also be provided for the purpose of slowing down the rotational speed of the rotor. The different solutions adopted in aviation for delaying the stall of the boundary layer can be used, such as the use of shark skin in nano-materials.

According to one embodiment, the blade can be held only at one of its ends. The architecture of the mechanism will be modified accordingly, since the shaft of the crankshaft must extend through the axle that connects the pod to the pulley in the case of a belt system.

According to different embodiments, the blade profile can vary in the longitudinal direction of the blade. More particularly, blades can be made with a chord longer at one end than at the other. In the case where the invention would be adopted to achieve a vertical axis wind turbine with blades held only at one end, the blades can be made wider at the arm side so as to better distribute the forces in the whole structure.

According to one embodiment, the rotational axis of blade 4 can be located in the first third of the blade, starting from the leading edge.

According to another embodiment, the angular control of the blades is done via horns which can be positioned at any place on the blades.

If the invention in generator mode faces extreme flow speed conditions, an embodiment can provide a design of rods 14 shown in FIG. 3, so that they can serve as a fuse by rupturing beyond a certain mechanical stress.

According to yet another embodiment, one can replace the crankshaft or more cams acting on one or more pushers, the latter actuating pneumatic or hydraulic pumps attached to the pod. These pumps allow actuating cylinders, pneumatic or hydraulic as appropriate, these cylinders being connected to the blade at one of their ends and to the pod at their other end. By operating these actuators, it is possible to rotate the blade about the fixed axis of the pod.

In the generator mode, a braking system can be provided to stop the rotor in an emergency situation, and to facilitate maintenance operations.

According to one embodiment, each of the constituent parts can be balanced in order to facilitate the starting of rotation of the structure while reducing vibration. For instance, the pods, the wings relative to their axis of rotation, and more generally all the moving assembly can be a balanced to facilitate the starting of rotation while improving the reliability of the machine.

In generator mode, an electric machine such as an AC alternator is driven by the rotor or via a multiplying or reducing transmission.

Alternatively, the AC generator can be replaced by any type of electrical generator, such as permanent magnet motors. The rotor may also drive a variety of hydraulic or pneumatic pumps.

According to other embodiments, the AC generators can be placed directly at the blade ends.

Ideally, all moving parts are mounted on ball bearings or bearings to minimize losses due to mechanical friction while reducing wear of the machine. A lubrication system involving an oil pump can be used to lubricate the mechanical parts according to the needs.

Another embodiment of the machine will now be described, in particular for operation according to the Voith-Schneider type kinematics, and also for the purpose of achieving a dual-mode machine where the rotor can be selectively placed in one operating mode or the another, e.g. in a Lipp type operating mode or a Voith-Schneider type operating mode.

In this regard has long been known the principle of the Voith-Schneider type rotor, such rotor being used for marine propeller mode in certain applications (river boats, tugs, ferries, etc.). Generally, the Voith-Schneider rotor kinematics is obtained using an eccentric member positioned at the center of the rotor and which controls the pitch of the blades through large-size rods. The mechanical elements are fairly large, which makes the high rotation speeds more complicated.

Furthermore, in propeller mode, a rotor with the Voith-Schneider type kinematics allows very high torque but does not allow high speeds, while a rotor with the Lipp type kinematics type allows high speeds. A propeller capable of switching from a kinematics to the other can thus show significant benefits in use.

Figure 10:
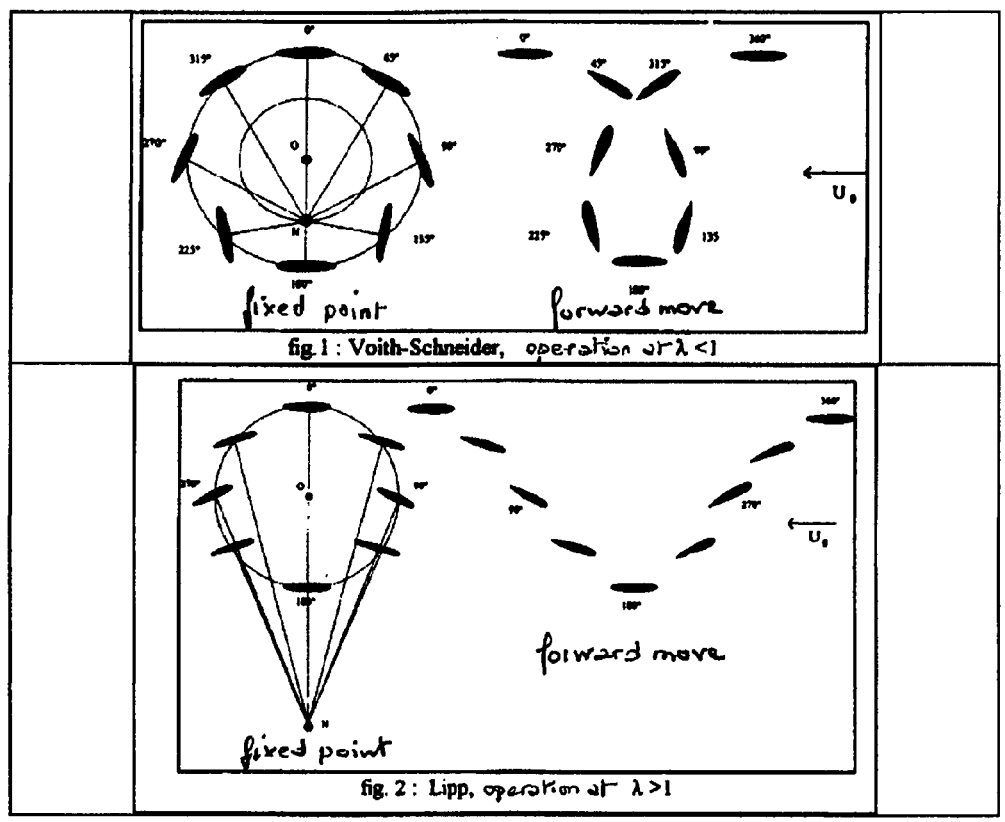
FIG. 10 shows for comparative purposes a Voith-Schneider-type kinematics and a Lipp-type kinematics.

Firstly, FIG. 10 graphically illustrates the differences between the Voith-Schneider type kinematics and the Lipp-type kinematics (from "Etude des Performances d'un Propulseur Cycloïdal Nouveau (Procédé Lipp)»>, J. F. Devillers, T. Pichon, R. Roucous, 5emes journées de l'hydrodynamique, 22, 23, 24 Mar. 1995, Rouen).

Figure 11:
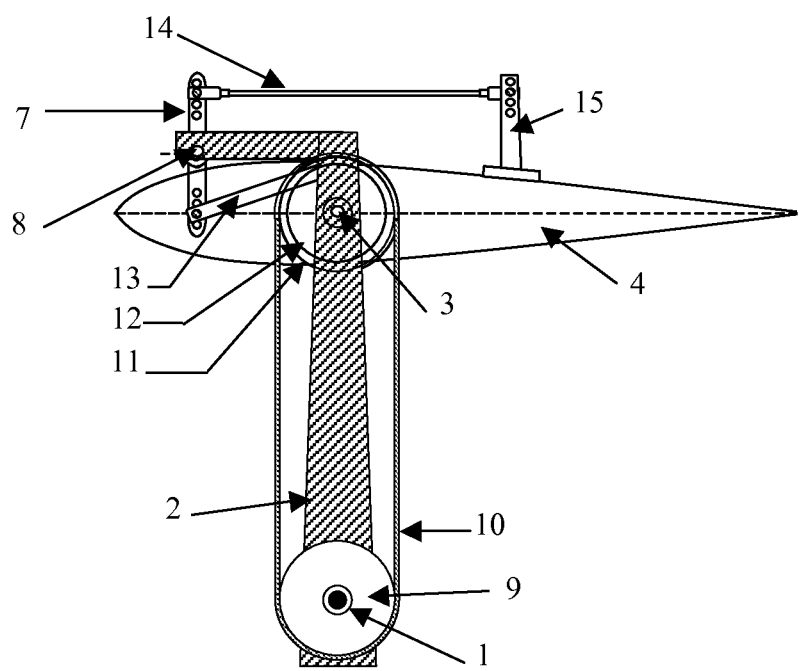
FIG. 11 shows in elevation and partly in section a version of the mechanism described above suitable for operation in Voith-Schneider-type kinematics.

Now referring to FIG. 11 will be described a machine operating in a Voith Schneider-type kinematics, based on the same general architecture as the one of the previous Figures. Members or parts identical or similar to those of the preceding figures are here indicated by the same reference signs and will not be described again.

To achieve the Voith-Schneider kinematics, the pivot 8 about which transfer member 7 pivots is here fixed relative to arm 2. In addition, the crankshaft 12, which drives connecting rod 13, is here driven by pulley 11 which is connected to pulley 9 via the belt 10 (or chain, etc.). As in Lipp-type operating mode, the pulley 9 is fixed.

Figure 12:
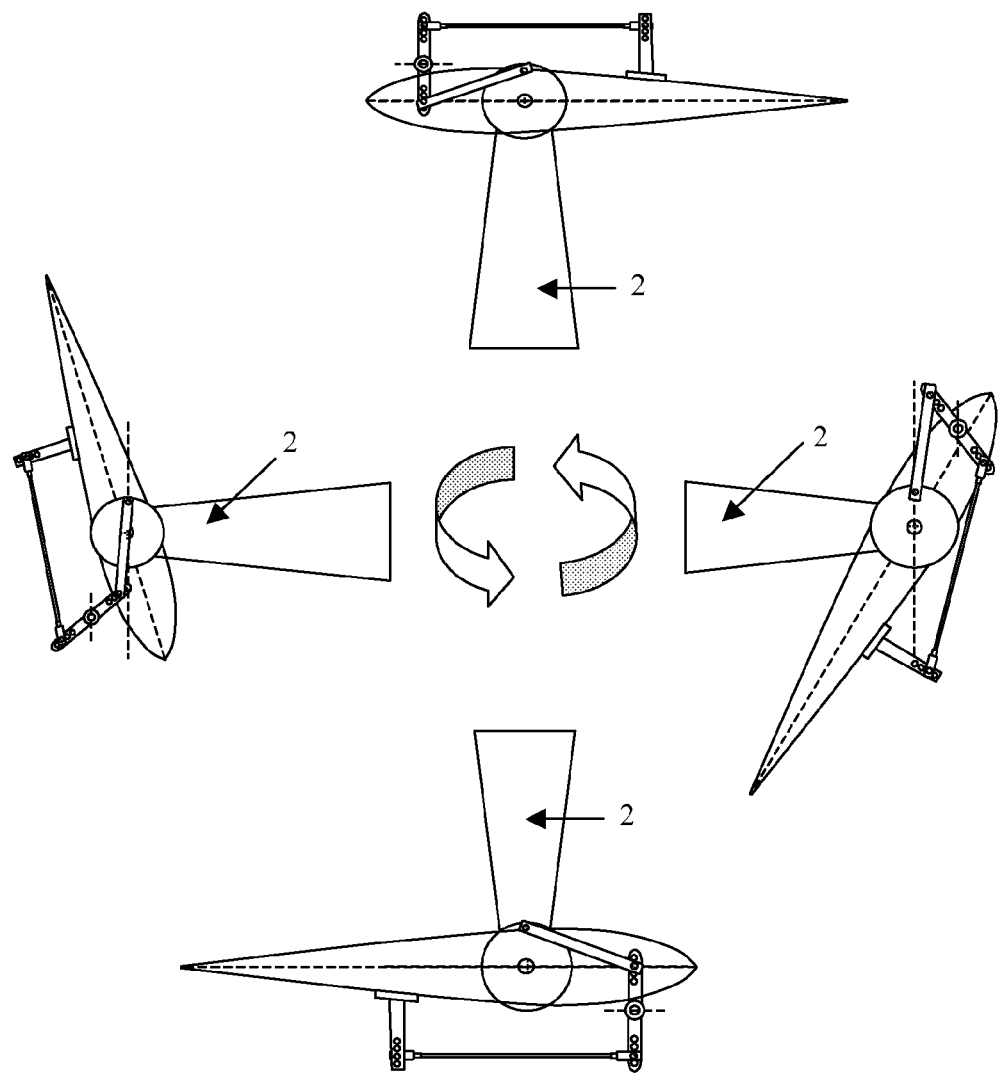
FIG. 12 illustrates the operation according to the Voith-Schneider-type kinematics for four rotor angles.

FIG. 12 illustrates the operation of this machine for 4 rotor angles. It can be seen that the fact that pivot 8 is fixed and the crankshaft is driven by pulley 11 allows, with the same link mechanism, to get a different kinematics, which is now of the Voith-Schneider type.

Figure 13A:
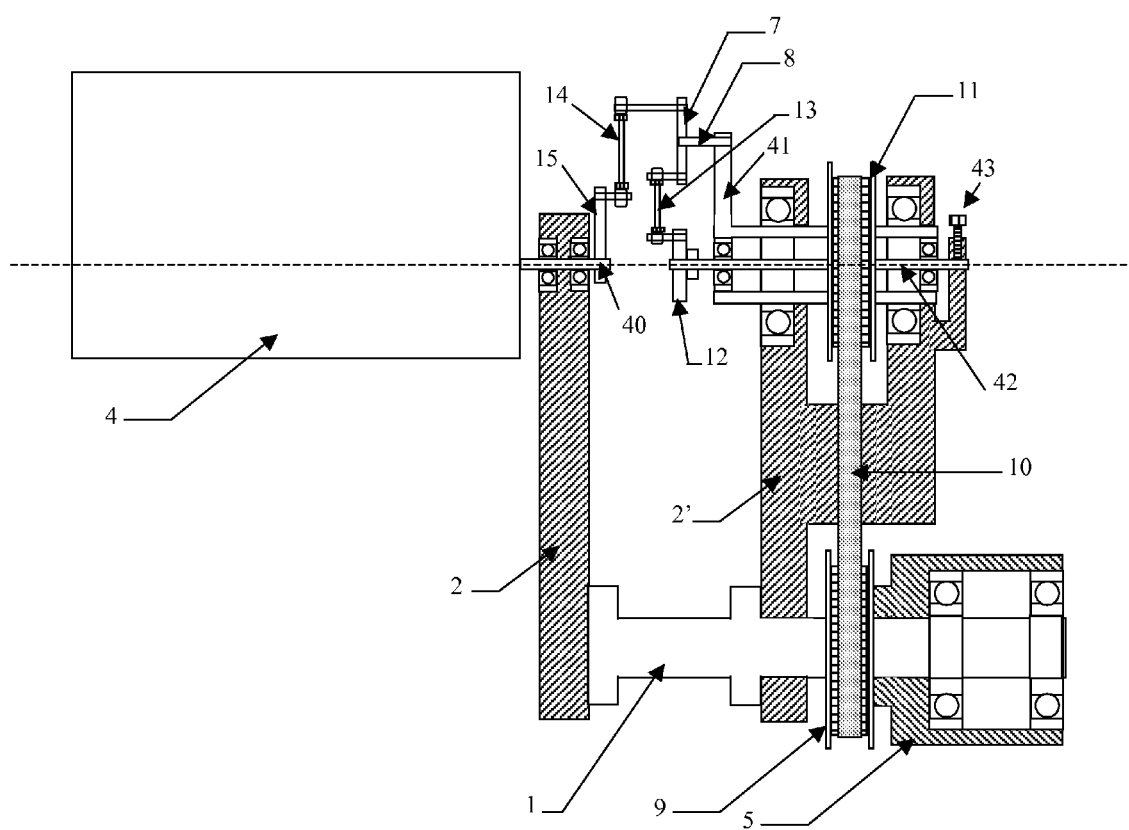
FIG. 13A illustrates another embodiment of the invention, with cantilever blades, suitable for operation in Lipp-type kinematics.
Figure 13B:
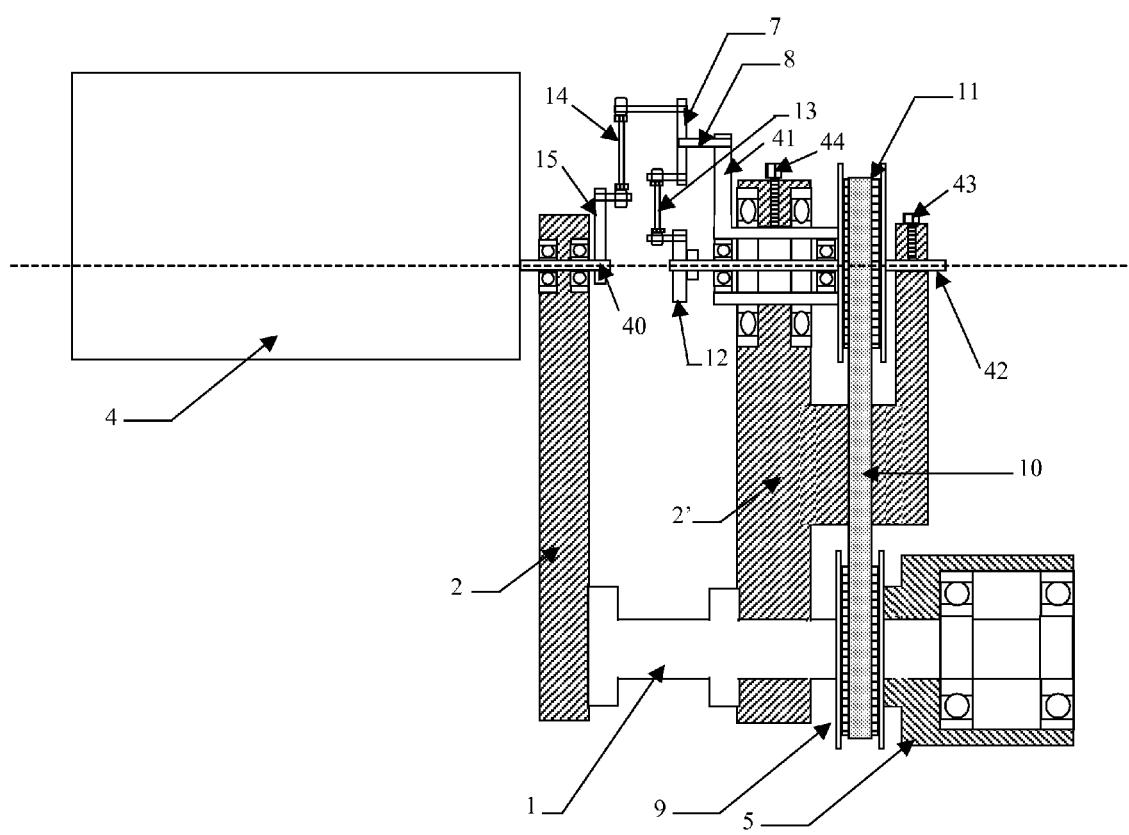
FIG. 13B illustrates an embodiment based on that of FIG. 13A, again with cantilever blades, suitable for operation in Voith-Schneider-type kinematics.

FIGS. 13A and 13B illustrate other embodiments of the invention, with cantilevered blades, not retained at their free end, with all the functions of mechanical support, drive and control being relocated at the ends of the blades opposite to their free ends.

FIG. 13A illustrates the case of a machine operating according to a Lipp-type kinematics. Blade 4 is driven by a shaft 40 extending through a bearing or roller bearing and on which horn 15 is affixed. Another shaft 42 extends inside a part 41 which forms an eccentric member, which is a functional equivalent of the pod 6 of the preceding embodiments. Shaft 42 is mounted on bearings or roller bearings for rotation relative to part 41. Pulley 11 selectively drives part 41 which carries off-center the pivot 8 about which the transfer member 7 pivots. Shaft 42 carries crankshaft 12 and is selectively blocked against rotation relative to a portion 2" of arm 2. Part 41 is mounted via bearings or roller bearings on arm portion 2", to rotate relative to said part.

In the example illustrated in FIG. 13 A, the selective blocking against rotation of shaft 42 relative to arm 2 is illustrated as being achieved by a locking screw 43 for the sake of clarity and simplification. In the same way, in FIG. 13B, a selective locking against rotation of part 41 relative to arm 2 is illustrated as being achieved by another locking screw 44, for the sake of clarity and simplification.

In the case of FIG. 13A (Lipp-type kinematics), pulley 11 drives part 41, while pin 42 is blocked by screw 43.

To switch from the Lipp mode to the Voith-Schneider mode, screw 44 (FIG. 13B) is clamped and pulley 11 drives shaft 42 while the part 41 is blocked against rotation.

It is thus understood that simple mechanical control means (the diagrammatic representation by locking screws being made here for the sake of clarity and understanding) allow passing from a Lipp-type kinematics to a Voith-Schneider-type kinematics. This possibility is very interesting, especially in propelling mode: indeed while the Voith Schneider mode offers a very good yield at low moving speeds (defined as the speed of the vehicle propelled by the rotor on the speed of the blades in their rotation), the Lipp mode conversely offers a very good yield at high moving speeds. It is therefore possible with one same rotor to combine a very high torque at low speeds and also enable very high speeds.

In summary, the solution for switching from one kinematics to the other consists in driving through pulley 11 a first axis while the second is blocked in a position, or vice versa. In an industrial embodiment, this type of mechanism can be based for example on catches and splined shafts as for gearboxes, mechanical or electromechanical clutch systems, electro-magnetic couplers, etc.

Figure 14A:
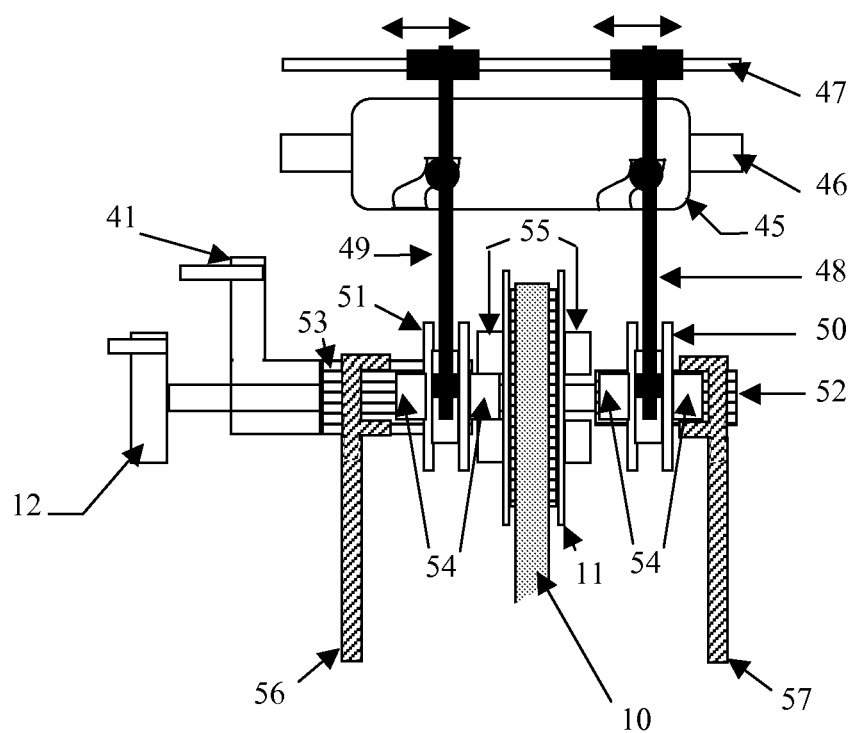
FIGS. 14A and 14B illustrate a possible example of a mode switching mechanism, in particular for switching from a Lipp-type kinematics operation to a Voith-Schneider-type kinematics operation.

An example of such a mode change mechanism will now be described with reference to FIGS. 14A and 14B. This mechanism comprises a cylinder 45 which rotates about an axis 46 and can be locked in one amongst two positions. The actuator allowing this action is not shown but it adopts the usual principle of sequential gearboxes used in motorcycles. The position selector can be controlled mechanically (or not) from a central command. The cylinder 45 comprises two paths for moving two forks 48 and 49 along an axis 47. Forks 48 and 49 drive parts 50 and 51, respectively. The latter, provided with grooves at their center, are adapted to be movable along two splined shafts 52 and 53, respectively, with which they are engaged. Parts 50 and 51 are also provided on each side with catches 54. Depending on the position of parts 50 and 51, these catches selectively engage with corresponding catches 55 carried by pulley 11 driven by belt 10, or by other catches constituted by parts 56 and 57, these parts being kept in fixed relative to arm 2, which carries the mechanism shown in these figures. The crankshaft 12 is united with splined shaft 52 while eccentric element 41 is united with the spline shaft 53. In the position illustrated in FIG. 14A, barrel 45 and thus forks 48 and 49 as well as parts 50 and 51, are in positions such that the crankshaft 12 is held in a given fixed position as being blocked against rotation by the part 57, while eccentric member 41 is coupled to the pinion 11. This generates the operation with Lipp-type kinematics.

Figure 14B:
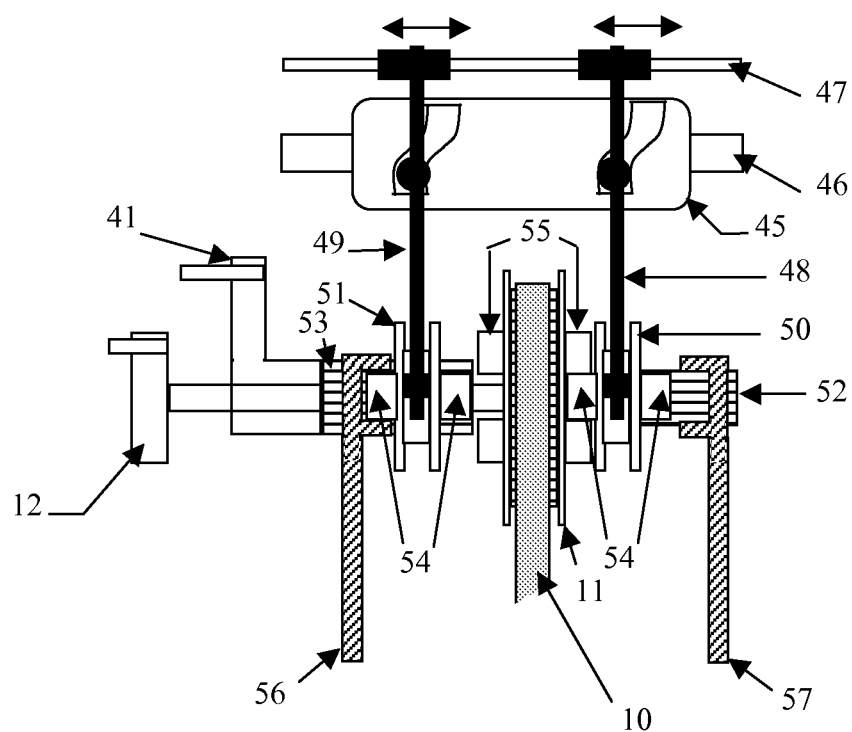

In the case of FIG. 14B, the barrel 45 has been moved to its second position so that barrel 45, brackets 48 and 49 and parts 50 and 51 are in positions such that the eccentric element 41 is held stationary in a determined position, as being blocked against rotation by part 56, while the crankshaft 12 is coupled to pinion 11. This brings back to the operation according to the Voith-Schneider-type kinematics.

Of course, the present invention is not limited to the embodiments described and shown, but the person skilled in the art can make many variations and modifications.

The invention claimed is:

1. A fluidic rotor rotary machine, the rotor comprising at least one blade (4) mounted on an arm rotating about a main axis of the rotor, the rotor being held by a support structure in an orientation such that said axis is essentially perpendicular to the fluid flow direction, the blade being pivotally mounted about a rotational axis parallel to the main axis, the machine further comprising a device for generating a relative rotational movement of the blade relative to the arm at the rotational axis, thereby varying the blade angle, said device for generating a relative rotational movement of the blade relative to the arm comprising:

an eccentric mechanism rotating on said blade rotational axis, said eccentric mechanism comprising an eccentric member and a transfer member connected to the blade, a mechanical transmission device for synchronizing the rotational movement of said eccentric member with the rotation of the rotor about the main axis and adapted to keep the eccentric member in the same orientation irrespective of the angular position of the rotor, to thereby provide a Lipp-type kinematics.

2. A machine according to claim 1, wherein the transfer member rotates about a pivot shifted relative to the rotational axis, one end of said transfer member being connected to the blade and the other end being connected to a crankshaft.

3. A machine according to claim 2, wherein the crankshaft is mounted on a shaft defining the rotational axis and mounted on the arm.

4. A machine according to claim 1, further comprising a device for varying the maximum pitch angle of the blade(s) as a function of the fluid flow velocity.

5. A machine according to claim 4, wherein said device for varying the maximum pitch angle of the blades comprises members for the self-modification of the geometry of the control between the eccentric mechanism and the blade.

6. A machine according to claim 4, wherein said device for varying the maximum pitch angle of the blade(s) comprises members for adjusting the control geometry between the eccentric mechanism and the blade.

7. A machine according to claim 1, wherein the constant orientation of the eccentric member is obtained by a one-to-one ratio angular transmission between a member rotating with the arm and a member rotating with the eccentric member.

8. A fluidic rotor rotary machine, the rotor comprising a plurality of blades mounted on respective arms rotating about a main axis of the rotor, the rotor being held by a support structure in an orientation such that said axis is essentially perpendicular to the fluid flow direction, each blade being pivotally mounted about a rotational axis parallel to the main axis, the machine further comprising a plurality of devices for generating a relative rotational movement of a respective blade relative to a respective arm at the respective rotational axis, thereby varying the blade angle, each device for generating a relative rotational movement of the blade relative to the arm comprising:

an eccentric mechanism rotating on said blade rotational axis, said eccentric mechanism comprising an eccentric member and a transfer member connected to the blade, a mechanical transmission device for synchronizing the rotational movement of said eccentric member with the rotation of the rotor about the main axis and adapted to keep the eccentric member in the same orientation irrespective of the angular position of the rotor, to thereby provide a Lipp-type kinematics.

9. A machine according to claim 8, wherein the constant orientation of the eccentric member is obtained by a plurality of one-to-one ratio angular transmissions between a member rotating with the arms and a member rotating with the respective eccentric member.

* * * * *